United States Patent
Noh et al.

(10) Patent No.: US 10,064,177 B2
(45) Date of Patent: Aug. 28, 2018

(54) RESOURCE ALLOCATION METHOD AND DEVICE IN WIRELESS ACCESS SYSTEM SUPPORTING FDR TRANSMISSION

(71) Applicant: LG ELECTRONICS INC., Seoul (KR)

(72) Inventors: Kwangseok Noh, Seoul (KR); Jaehoon Chung, Seoul (KR); Genebeck Hahn, Seoul (KR); Eunjong Lee, Seoul (KR); Jinmin Kim, Seoul (KR); Kukheon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 15/114,723

(22) PCT Filed: Feb. 16, 2015

(86) PCT No.: PCT/KR2015/001541
§ 371 (c)(1),
(2) Date: Jul. 27, 2016

(87) PCT Pub. No.: WO2015/122732
PCT Pub. Date: Aug. 20, 2015

(65) Prior Publication Data
US 2016/0345315 A1  Nov. 24, 2016

Related U.S. Application Data

(60) Provisional application No. 61/940,485, filed on Feb. 16, 2014, provisional application No. 61/949,267, filed on Mar. 7, 2014.

(51) Int. Cl.
*H04W 72/04* (2009.01)
*H04W 72/08* (2009.01)
(Continued)

(52) U.S. Cl.
CPC ....... *H04W 72/0446* (2013.01); *H04L 5/1469* (2013.01); *H04W 72/042* (2013.01);
(Continued)

(58) Field of Classification Search
None
See application file for complete search history.

(56) References Cited

U.S. PATENT DOCUMENTS

2009/0135748 A1   5/2009  Lindoff et al.
2010/0273494 A1*  10/2010  Iwai ..................... H04L 5/0007
                                                      455/450
(Continued)

FOREIGN PATENT DOCUMENTS

EP         1227602       7/2002
KR     10-2009-0106552   10/2009
(Continued)

OTHER PUBLICATIONS

PCT International Application No. PCT/KR2015/001541, Written Opinion of the International Searching Authority dated May 21, 2015, 16 pages.
(Continued)

*Primary Examiner* — Faruk Hamza
*Assistant Examiner* — Cassandra Decker
(74) *Attorney, Agent, or Firm* — Lee Hong Degerman Kang Waimey

(57) ABSTRACT

The present invention relates to a wireless access system supporting a full duplex radio (FDR) transmission environment. A resource allocation method of a base station in a wireless access system that supports a FDR, according to one embodiment of the present invention, comprises the steps of: transmitting a first frame setting for a configuration of an uplink subframe and a downlink subframe to a terminal which is set by a terminal-specific TDD; receiving, from the
(Continued)

terminal, response information including traffic information of the terminal and/or frame setting information preferred by the terminal; and transmitting a second frame setting which has adjusted the ratios of the uplink subframe and the downlink subframe on the basis of the response information, wherein the second frame setting is capable of being set by shifting the first frame setting on the basis of the number of FDR interference terminals which simultaneously transmit an uplink.

14 Claims, 14 Drawing Sheets

(51) Int. Cl.
  *H04L 5/14*     (2006.01)
  *H04W 88/08*    (2009.01)
(52) U.S. Cl.
  CPC ..... *H04W 72/0406* (2013.01); *H04W 72/048* (2013.01); *H04W 72/082* (2013.01); *H04W 88/08* (2013.01)

(56) References Cited

U.S. PATENT DOCUMENTS

| | | |
|---|---|---|
| 2011/0280165 A1 | 11/2011 | Howard |
| 2011/0312357 A1* | 12/2011 | Haustein ................ H04B 7/022 455/502 |
| 2013/0039253 A1 | 2/2013 | Takano |
| 2013/0155912 A1 | 6/2013 | Khojastepour et al. |
| 2013/0188536 A1* | 7/2013 | Pirskanen ......... H04W 72/0453 370/281 |
| 2013/0250772 A1* | 9/2013 | Yin ........................... H04L 5/16 370/241 |
| 2014/0003270 A1* | 1/2014 | Maltsev ................ H04W 52/34 370/252 |
| 2014/0369221 A1* | 12/2014 | Fu ........................... H04L 5/006 370/252 |
| 2016/0080133 A1* | 3/2016 | Golitschek Edler von Elbwart ..... H04W 72/0446 370/280 |
| 2017/0026923 A1* | 1/2017 | Han ..................... H04J 11/0069 |

FOREIGN PATENT DOCUMENTS

| | | |
|---|---|---|
| KR | 10-2013-0058567 | 6/2013 |
| KR | 10-2013-0069867 | 6/2013 |
| WO | WO 2007097597 A2 * | 8/2007 .......... H04J 11/0069 |

OTHER PUBLICATIONS

European Patent Office Application Serial No. 15748440.3, Search Report dated Sep. 20, 2017, 9 pages.

* cited by examiner

FIG. 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5
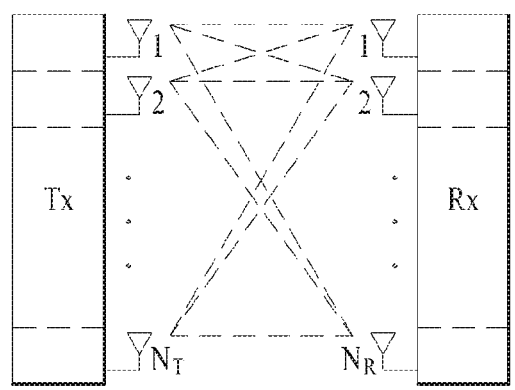
(a)
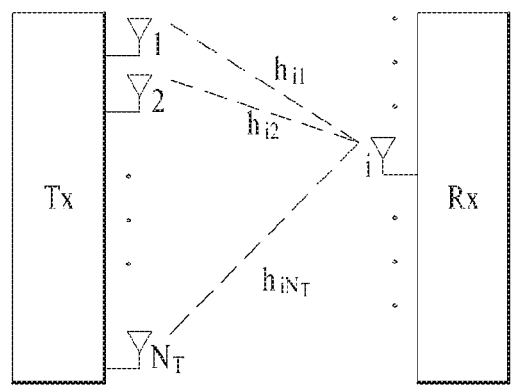
(b)

FIG. 15 subframe number

| configuration | 0 | 1 | 2 | 3 | 4 | 5 | 6 | 7 | 8 | 9 |
|---|---|---|---|---|---|---|---|---|---|---|
| 3 | D | S | U | U | U | D | D | D | D | D |
| 4 | D | D | D | D | S | U | U | D | D | D |
| 5 | D | D | D | D | D | D | S | U | D | D |

FIG. 16 subframe number

| 0 | 1 | 2 | 3 | 4 | 5 | 6 | 7 | 8 | 9 |
|---|---|---|---|---|---|---|---|---|---|
| U | U | U | U | U | U | U | U | U | U |

| D | D | D | D | D | D | D | D | D | D |
|---|---|---|---|---|---|---|---|---|---|

FIG. 17 subframe number

| 0 | 1 | 2 | 3 | 4 | 5 | 6 | 7 | 8 | 9 |
|---|---|---|---|---|---|---|---|---|---|
| 0 | 0 | 0 | 1 | 0 | 0 | 0 | 0 | 0 | 0 |

RESOURCE ALLOCATION METHOD AND DEVICE IN WIRELESS ACCESS SYSTEM SUPPORTING FDR TRANSMISSION

CROSS-REFERENCE TO RELATED APPLICATIONS

This application is the National Stage filing under 35 U.S.C. 371 of International Application No. PCT/KR2015/001541, filed on Feb. 16, 2015, which claims the benefit of U.S. Provisional Application No. 61/940,485, filed on Feb. 16, 2014 and 61/949,267, filed on Mar. 7, 2014, the contents of which are all hereby incorporated by reference herein in their entirety.

TECHNICAL FIELD

The present invention relates to a wireless access system supporting a Full Duplex Radio (FDR) transmission environment and, more particularly, to a method for efficiently transmitting and receiving a signal when FDR is applied and an apparatus supporting the same.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide resource allocation methods for efficiently transmitting and receiving data in a wireless access system supporting FDR transmission.

Another object of the present invention is to provide an apparatus supporting the above methods.

The technical objects that can be achieved through the present invention are not limited to what has been particularly described hereinabove and other technical objects not described herein will be more clearly understood by persons skilled in the art from the following detailed description.

Technical Solution

According to an aspect of the present invention devised to solve the above problems, a method of allocating a resource by a Base Station (BS) in a wireless access system supporting Full Duplex Radio (FDR) transmission includes transmitting a first frame configuration regarding a configuration of uplink subframes and downlink subframes to a User Equipment (UE) configured in a UE-specific Time Division Multiplexing (TDD) mode, receiving response information including at least one of traffic information of the UE and frame configuration information indicating a frame configuration preferred by the UE from the UE, and transmitting a second frame configuration in which a ratio between the uplink subframes and the downlink subframes is adjusted based on the response information, wherein the second frame configuration is set by shifting the first frame configuration based on the number of FDR interfering UEs that simultaneously perform uplink transmission.

The method may further include transmitting identification information of the interfering UEs used to measure inter-device interference according to FDR transmission.

The method may further include transmitting information about subframes in which the identification information of the interfering UEs can be received to the UE.

The identification information of the interfering UEs may be generated using a code sequence.

If the UE and the FDR interfering UEs simultaneously perform data transmission and reception, the identification information of the interfering UEs may be transmitted in an uplink subframe of the UE at a first timing at which an uplink subframe of the UE and downlink subframes of the FDR interfering UEs are simultaneously configured.

The second frame configuration may be set in consideration of the number of switch-points at which an uplink frame is changed to a downlink frame.

The first frame configuration information may have the same ratio between uplink subframes and downlink subframes.

According to another aspect of the present invention, a base station (BS) for allocating a resource in a wireless access system supporting Full Duplex Radio (FDR) transmission includes a Radio Frequency (RF) unit and a processor, wherein the processor is configured to transmit a first frame configuration regarding a configuration of uplink subframes and downlink subframes to a User Equipment (UE) configured in a UE-specific Time Division Multiplexing (TDD) mode, to receive response information including at least one of traffic information of the UE and frame configuration information indicating a frame configuration preferred by the UE from the UE, and to transmit a second frame configuration in which a ratio between the uplink subframes and the downlink subframes is adjusted based on the response information, and wherein the second frame configuration is set by shifting the first frame configuration based on the number of FDR interfering UEs that simultaneously perform uplink transmission.

The processor may be further configured to transmit identification information of the interfering UEs used to measure inter-device interference according to FDR transmission.

The processor may be further configured to transmit information about subframes in which the identification information of the interfering UEs can be received to the UE.

The identification information of the interfering UEs may be generated using a code sequence.

If the UE and the FDR interfering UEs simultaneously perform data transmission and reception, the identification information of the interfering UEs may be transmitted in an uplink subframe of the UE at a first timing at which an uplink subframe of the UE and downlink subframes of the FDR interfering UEs are simultaneously configured.

The second frame configuration may be set in consideration of the number of switch-points at which an uplink frame is changed to a downlink frame.

The first frame configuration information may have the same ratio between uplink subframes and downlink subframes.

The foregoing general description and following detailed description of the present invention are exemplary and explanatory and are intended to provide further explanation of the invention as claimed.

Advantageous Effects

According to embodiments of the present invention, the following effects can be obtained.

First, data can be efficiently transmitted and received in a wireless access system supporting FDR transmission.

Effects according to the present invention are not limited to what has been particularly described hereinabove and other advantages not described herein will be more clearly understood by persons skilled in the art from the following detailed description of the present invention. That is, unintended effects of the present invention may also be derived by those skilled in the art from the embodiments of the present invention.

DESCRIPTION OF DRAWINGS

FIG. 2 illustrates exemplary frame configurations in the structure of the radio frame of FIG. 1.

FIG. 5 illustrates the configuration of a wireless communication system supporting MIMO.

FIG. 15 illustrates exemplary frame configurations obtained by shifting subframes considering distribution of U subframes as well as the minimum number of switch-points.

FIG. 16 illustrates exemplary frame configurations without switch-points.

FIG. 17 illustrates exemplary 1-bit interference information.

BEST MODE

Figure 1:
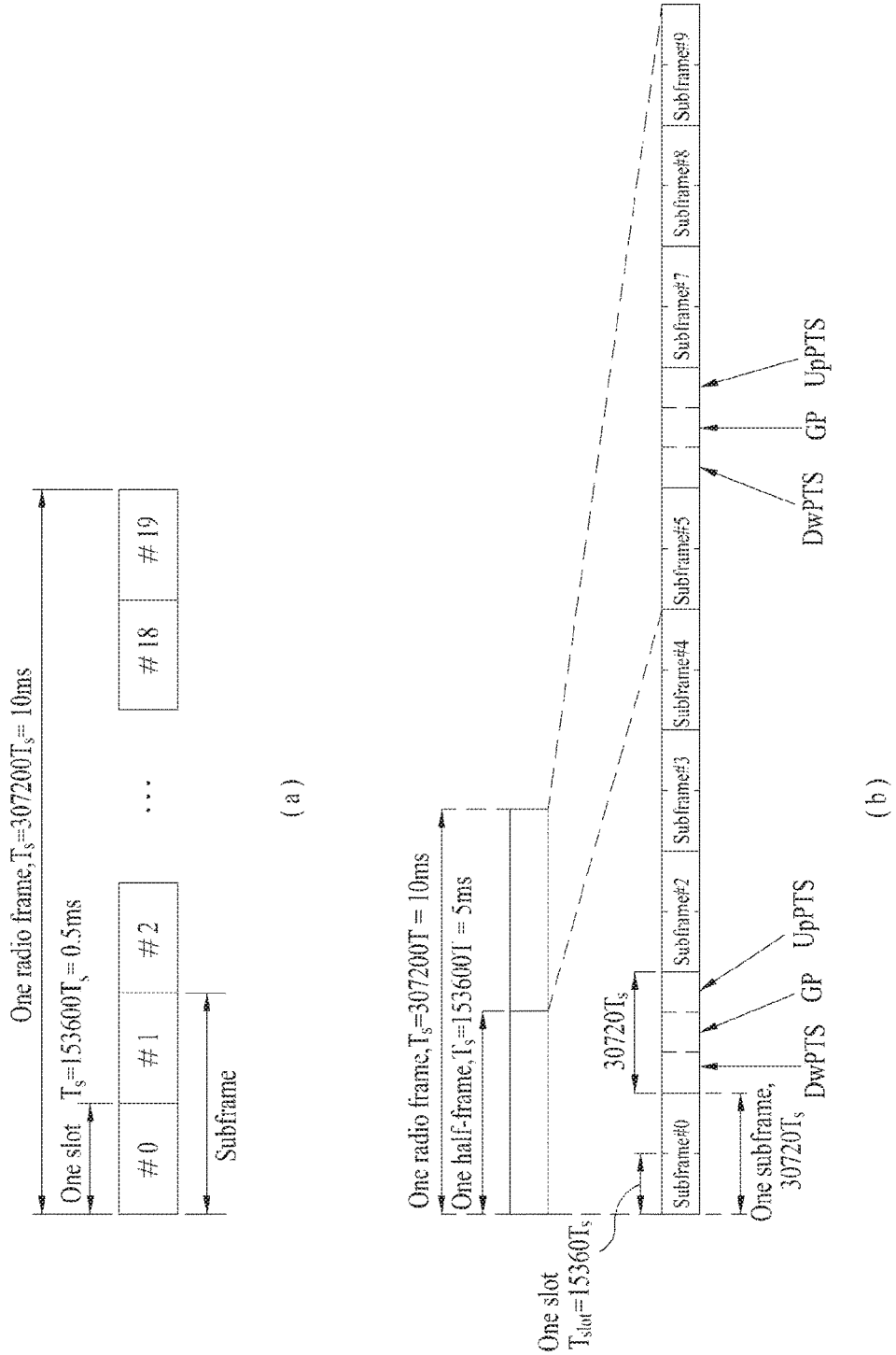
FIG. 1 illustrates the structure of a radio frame in 3GPP LTE.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a Base Station (BS) and a terminal. In this case, the BS is used as a terminal node of a network via which the BS can directly communicate with the terminal. Specific operations to be conducted by the BS in the present invention may also be conducted by an upper node of the BS as necessary.

In other words, it will be obvious to those skilled in the art that various operations for enabling the BS to communicate with the terminal in a network composed of several network nodes including the BS will be conducted by the BS or other network nodes other than the BS. The term "BS" may be replaced with a fixed station, Node B, evolved Node B (eNB or eNode B), or an Access Point (AP) as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied with wireless (or radio) technology such as Universal Terrestrial Radio Access (UTRA) or CDMA2000. TDMA may be embodied with wireless (or radio) technology such as Global System for Mobile communications (GSM)/General Packet Radio Service (GPRS)/Enhanced Data Rates for GSM Evolution (EDGE). OFDMA may be embodied with wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). UTRA is a part of Universal Mobile Telecommunications System (UMTS). 3rd Generation Partnership Project Long Term Evolution (3GPP LTE) is a part of Evolved UMTS (E-UMTS), which uses E-UTRA. 3GPP LTE employs OFDMA in downlink and employs SC-FDMA in uplink. LTE-Advanced (LTE-A) is an evolution of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, the technical features of the present invention are not limited thereto.

FIG. 1 illustrates the structure of a radio frame in 3GPP LTE.

Frame structure type 2 is illustrated in FIG. 1. Frame structure type 2 is applicable to a Time Division Duplex (TDD) system. One radio frame has a length of $T_f=307200 \cdot T_s=10$ ms and includes two half frames each having a length of $153600 \cdot T_s=5$ ms. Each half frame includes 5 subframes each having a length of $30720 \cdot T_s=1$ ms. An i-th subframe includes two slots $2i$ and $2i+1$ each having a length of $T_{slot}=15360 \cdot T_s=0.5$ ms. Ts is a sampling time given as Ts=1/(15 kHz×2048)=3.2552×10−8 (about 33 ns).

Frame structure type 2 includes a special subframe having three fields: a Downlink Pilot Time Slot (DwPTS), a Guard Period (GP), and an Uplink Pilot Time Slot (UpPTS). The DwPTS is used for initial cell search, synchronization, or channel estimation at a UE. The UpPTS is used for channel estimation and uplink transmission synchronization with a UE at an eNB. The GP is used to cancel interference between an uplink and a downlink, caused by multi-path delay of a downlink signal. The DwPTS, the GP, and the UpPTS are included in the special subframe of Table 1.

FIG. 2 illustrates exemplary frame configurations in the structure of the radio frame of FIG. 1.

In FIG. 2, D denotes a subframe for downlink transmission, U denotes a subframe for uplink transmission, and S denotes a special subframe for a guard time.

All UEs in each cell commonly have one frame configuration in the configurations of FIG. 2. That is, a frame configuration varies with a cell, the frame configuration may be called a cell-specific configuration.

Figure 3:
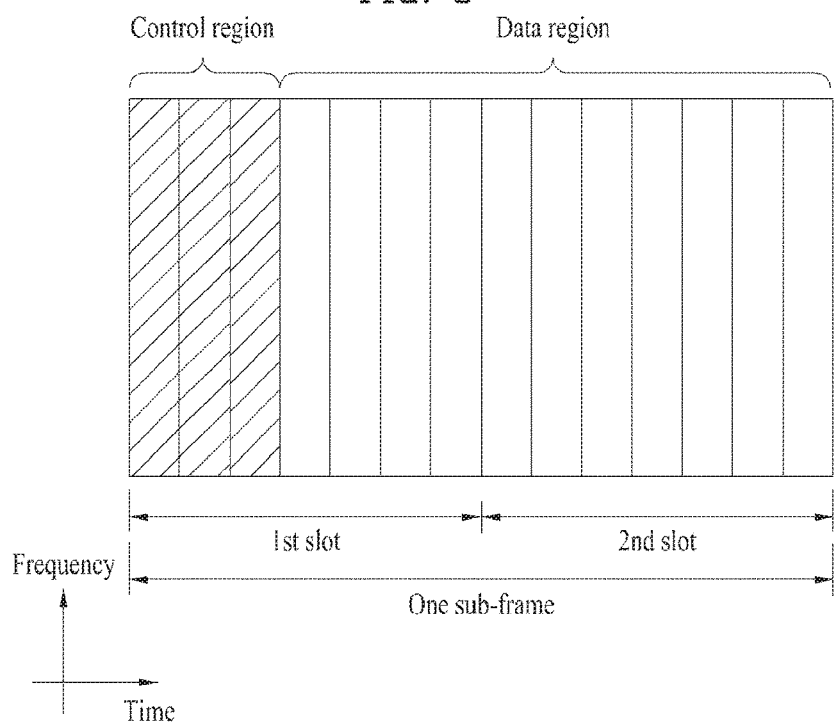
FIG. 3 is a diagram illustrating the structure of a downlink subframe.

FIG. 3 is a diagram illustrating the structure of a downlink subframe. Up to three OFDM symbols at the start of a first slot of one subframe corresponds to a control region to which a control channel is allocated. The remaining OFDM symbols correspond to a data region to which a Physical Downlink Shared Channel (PDSCH) is allocated. A basic transmission unit is one subframe. That is, a PDCCH and a PDSCH are allocated across two slots. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is located in the first OFDM symbol of a subframe, carrying information about the number of OFDM symbols used for control channels in the subframe. The PHICH includes a HARQ ACKnowledgment/Negative ACKnowledgment (ACK/NACK) signal as a response to an uplink transmission. The control information transmitted on the PDCCH is referred to as Downlink Control Information (DCI). The DCI includes uplink or downlink scheduling information or an uplink transmit power control command for a certain UE group. The PDCCH may include information about resource allocation and transmission format of a Downlink Shared Channel (DL-SCH), resource allocation information of an Uplink Shared Channel (UL-SCH), paging information of a Paging Channel (PCH), system information on the DL-SCH, information about resource allocation of an higher layer control message such as a Random Access Response (RAR) transmitted on the PDSCH, a set of transmit power control commands for individual UEs in a certain UE group, transmit power control information, information about activation of Voice over IP (VoIP), etc. A plurality of PDCCHs may be transmitted in the control region. A UE may monitor the plurality of PDCCHs. The PDCCHs are transmitted on an aggregation of one or several contiguous Control Channel Elements (CCEs). A CCE is a logical allocation unit used to provide the PDCCHs at a coding rate based on the state of a radio channel. The CCE includes a set of REs. A format and the number of available bits for the PDCCH are determined based on the correlation between the number of CCEs and the coding rate provided by the CCEs. The BS determines a PDCCH format according to DCI to be transmitted to the UE, and attaches a Cyclic Redundancy Check (CRC) to control information. The CRC is masked by a Radio Network Temporary Identifier (RNTI) according to the owner or usage of the PDCCH. If the PDCCH is for a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a system information identifier and a System Information RNTI (SI-RNTI). To indicate a random access response to a random access preamble received from the UE, the CRC may be masked by a random access-RNTI (RA-RNTI).

Figure 4:
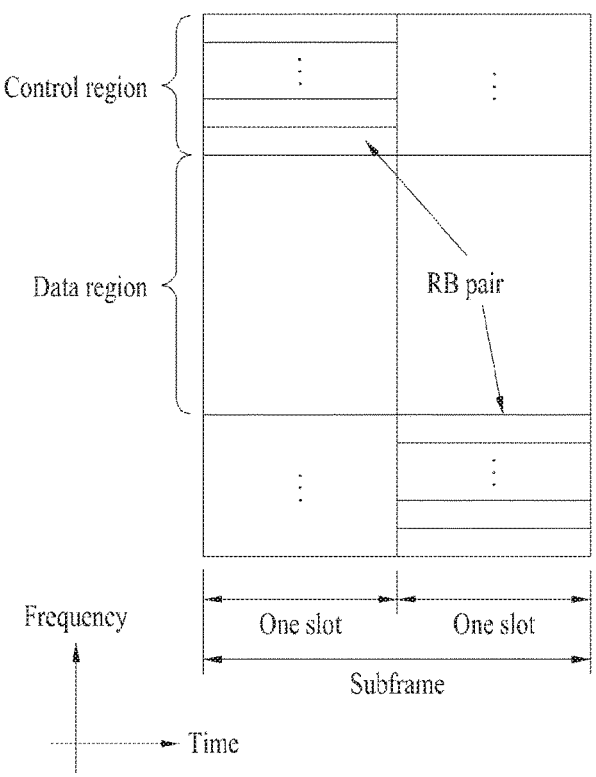
FIG. 4 is a diagram illustrating the structure of an uplink subframe.

FIG. 4 is a diagram illustrating the structure of an uplink subframe. The uplink subframe may be divided into a control region and a data region in the frequency domain. A Physical Uplink Control Channel (PUCCH) including uplink control information is allocated to the control region. A Physical uplink Shared Channel (PUSCH) including user data is allocated to the data region. In order to maintain single carrier property, one UE does not simultaneously transmit the PUCCH and the PUSCH. A PUCCH for one UE is allocated to an RB pair in a subframe. The RBs of the RB pair occupy different subcarriers in two slots. Thus, the RB pair allocated to the PUCCH is "frequency-hopped" over a slot boundary.

Modeling of Multiple Input Multiple Output (MIMO) System

The MIMO system increases data transmission/reception efficiency using a plurality of Tx antennas and a plurality of Rx antennas. MIMO is an application of putting data segments received from a plurality of antennas into a whole message, without depending on a single antenna path to receive the whole message.

MIMO schemes are classified into spatial diversity and spatial multiplexing. Spatial diversity increases transmission reliability or a cell radius using diversity gain and thus is suitable for data transmission for a fast moving UE. In spatial multiplexing, multiple Tx antennas simultaneously transmit different data and thus high-speed data can be transmitted without increasing a system bandwidth.

FIG. 5 illustrates the configuration of a wireless communication system supporting MIMO. Referring to FIG. 5(a), when the number of Transmission (Tx) antennas and the number of Reception (Rx) antennas are increased to NT and NR, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate Ro that may be achieved in case of a single antenna and a rate increase rate Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with NT Tx antennas and NR Rx antennas will be described in detail through mathematical modeling.

Regarding a transmission signal, up to NT pieces of information can be transmitted through the NT Tx antennas, as expressed as the following vector.

$$s = [s_1, s_2, \ldots, s_{N_T}]^T \qquad \text{[Equation 2]}$$

A different transmission power may be applied to each piece of transmission information, $s_1, s_2, \ldots s_{N_T}$. Let the transmit power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Here, $w_{ij}$ denotes a weight between a jth piece of information and an ith Tx antenna and W is a precoding matrix.

The transmitted signal x may be differently processed using according to two schemes (for example, spatial diversity and spatial multiplexing). In spatial multiplexing, different signals are multiplexed and transmitted to a receiver such that elements of information vector(s) have different values. In spatial diversity, the same signal is repeatedly transmitted through a plurality of channel paths such that elements of information vector(s) have the same value. Spatial multiplexing and spatial diversity may be used in combination. For example, the same signal may be transmitted through three Tx antennas in spatial diversity, while the remaining signals may be transmitted to the receiver in spatial multiplexing.

Given NR Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a jth Tx antenna and an ith Rx antenna is denoted by hij. Notably, the index of an Rx antenna precedes the index of a Tx antenna in hij.

FIG. 5(b) illustrates channels from NT Tx antennas to an ith Rx antenna. The channels may be collectively represented as a vector or a matrix. Referring to FIG. 5(b), the channels from the NT Tx antennas to the ith Rx antenna may be expressed as $$h_i^T = [h_{i1}, h_{i2}, \ldots, h_{iN_T}] \qquad \text{[Equation 7]}$$

Hence, all channels from the NT Tx antennas to the NR Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Actual channels experience the above channel matrix H and then are added with Additive White Gaussian Noise (AWGN). The AWGN added to the NR Rx antennas is given as the following vector.

$$n=[n_1, n_2, \ldots, n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \vdots \\ h_{i1} & h_{i2} & \ldots & h_{iN_T} \\ \vdots & & \ddots & \vdots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx+n$$

The numbers of rows and columns in the channel matrix H representing channel states are determined according to the numbers of Rx and Tx antennas. Specifically, the number of rows in the channel matrix H is equal to the number of Rx antennas, NR and the number of columns in the channel matrix H is equal to the number of Tx antennas, NT. Hence, the channel matrix H is of size NR×NT.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

In MIMO transmission, the term "rank" denotes the number of paths for independently transmitting signals, and the term "number of layers" denotes the number of signal streams transmitted through respective paths. In general, since a transmitter transmits as many layers as the number of ranks used for signal transmission, the rank has the same meaning as the number of layers unless otherwise noted.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
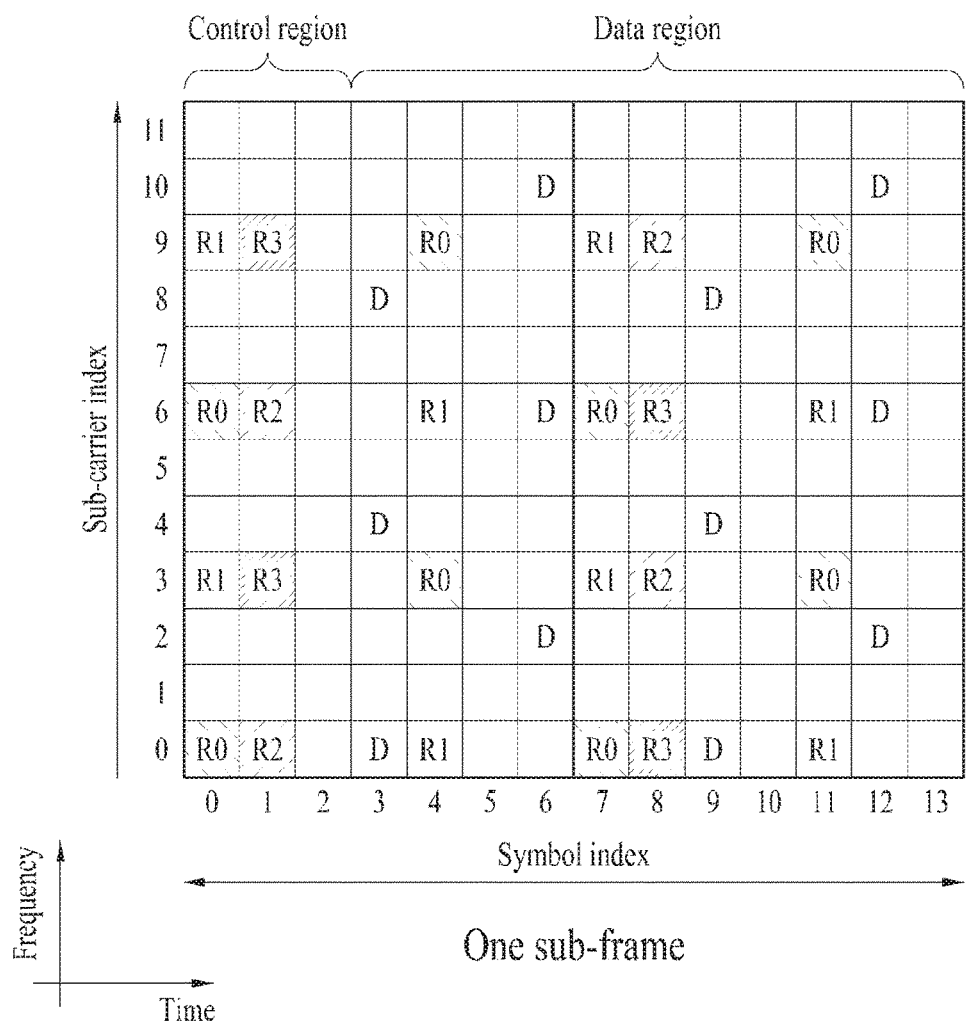
FIG. 6 illustrates an exemplary CRS and DRS pattern for one resource block.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a Modulation and Coding Scheme (MCS), a Precoding Matrix Index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
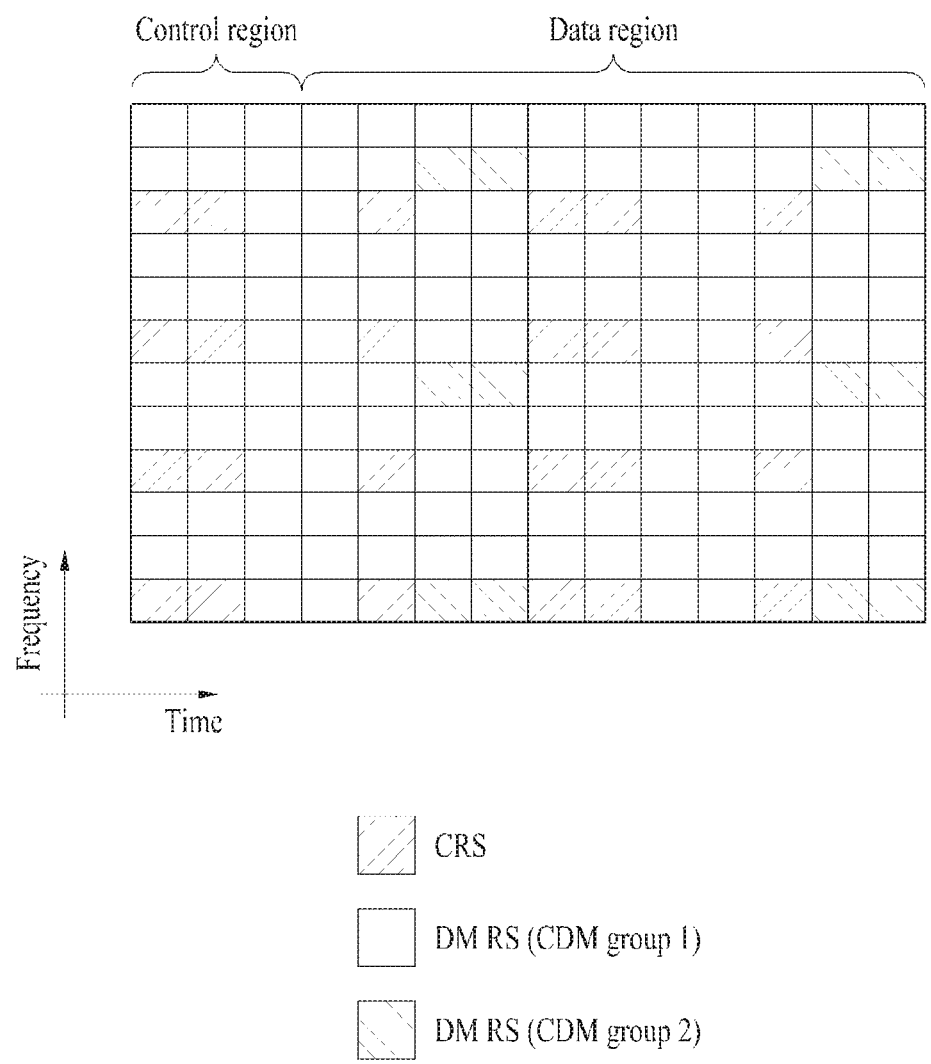
FIG. 7 illustrates an exemplary DM RS pattern defined for the LTE-A system.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in Frequency Division Multiplexing (FDM) and/or Time Division Multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
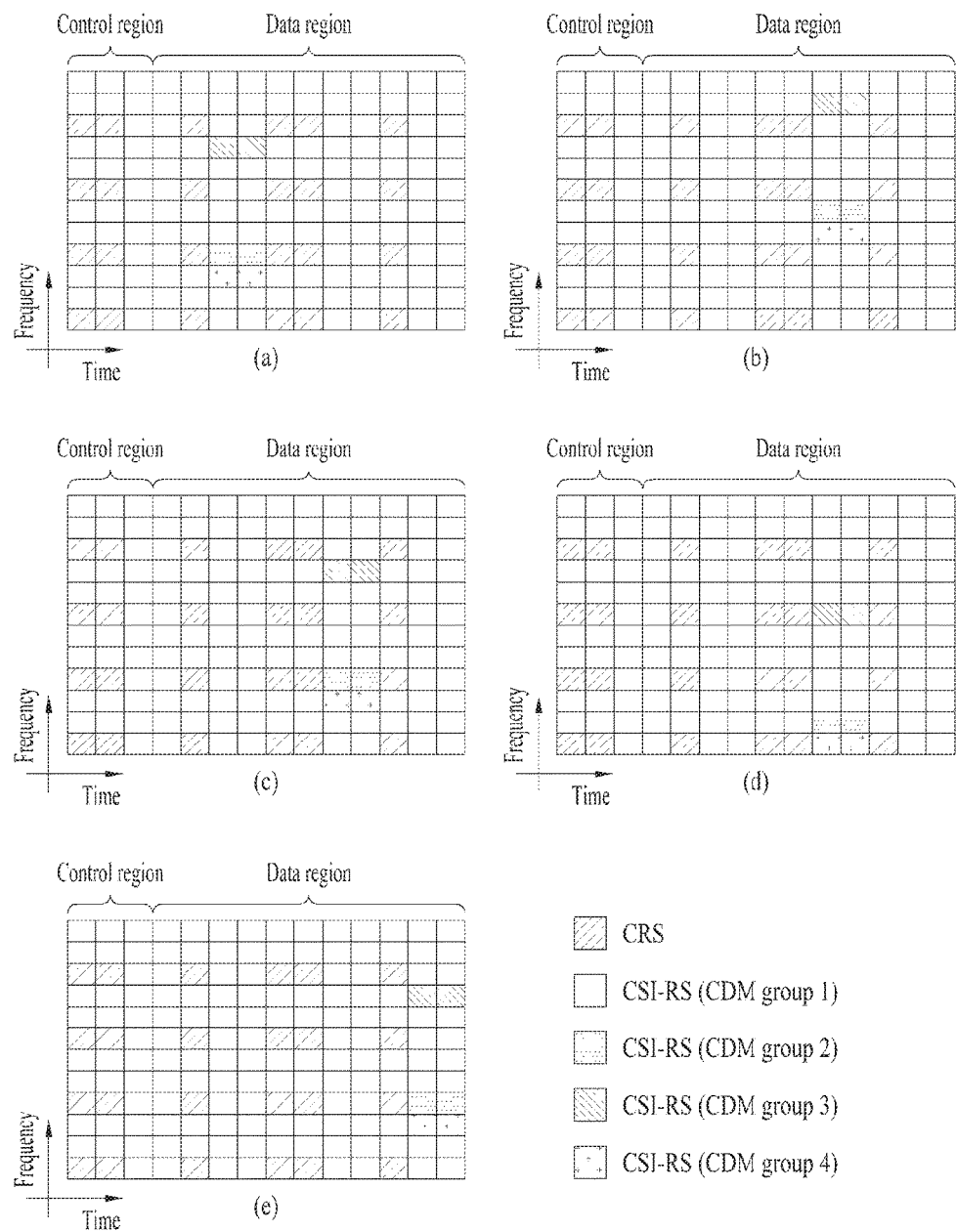
FIG. 8 illustrates exemplary CSI-RS patterns defined for the LTE-A system.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
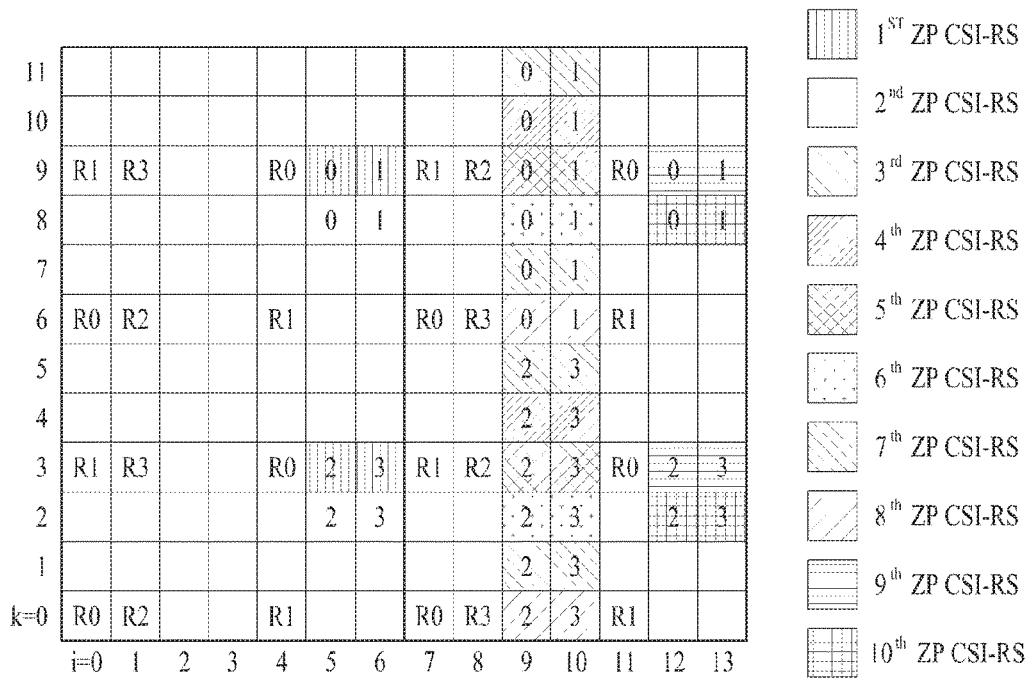
FIG. 9 is a diagram illustrating an exemplary Zero-Power (ZP) CSI-RS pattern defined in an LTE-A system.

FIG. 9 is a diagram illustrating an exemplary Zero-Power (ZP) CSI-RS pattern defined in an LTE-A system. A ZP CSI-RS is largely used for two purposes. First, the ZP CSI-RS is used to improve CSI-RS performance. That is, one network may mute a CSI-RS RE of another network in order to improve CSI-RS measurement performance of the other network and inform a UE thereof of the muted RE by setting the muted RE to a ZP CSI-RS so that the UE may correctly perform rate matching. Second, the ZP CSI-RS is used for interference measurement for CoMP CQI calculation. That is, some networks may mute a ZP CRS-RS RE and a UE may calculate a CoMP CQI by measuring interference from the ZP CSI-RS.

The RS patterns of FIGS. 6 to 9 are purely exemplary and an RS pattern applied to various embodiments of the present invention is not limited to such specific RS patterns. In other words, even when an RS pattern different from the RS patterns of FIGS. 6 to 9 is defined and used, various embodiments of the present invention may be identically applied.

Full Duplex Radio (FDR) Transmission

A system supporting FDR refers to a system capable of simultaneously supporting transmission and reception using the same resource in a transmission device. For example, an eNB or a UE supporting FDR transmission may perform transmission without performing uplink/downlink duplexing in frequency/time, etc.

Figure 10:
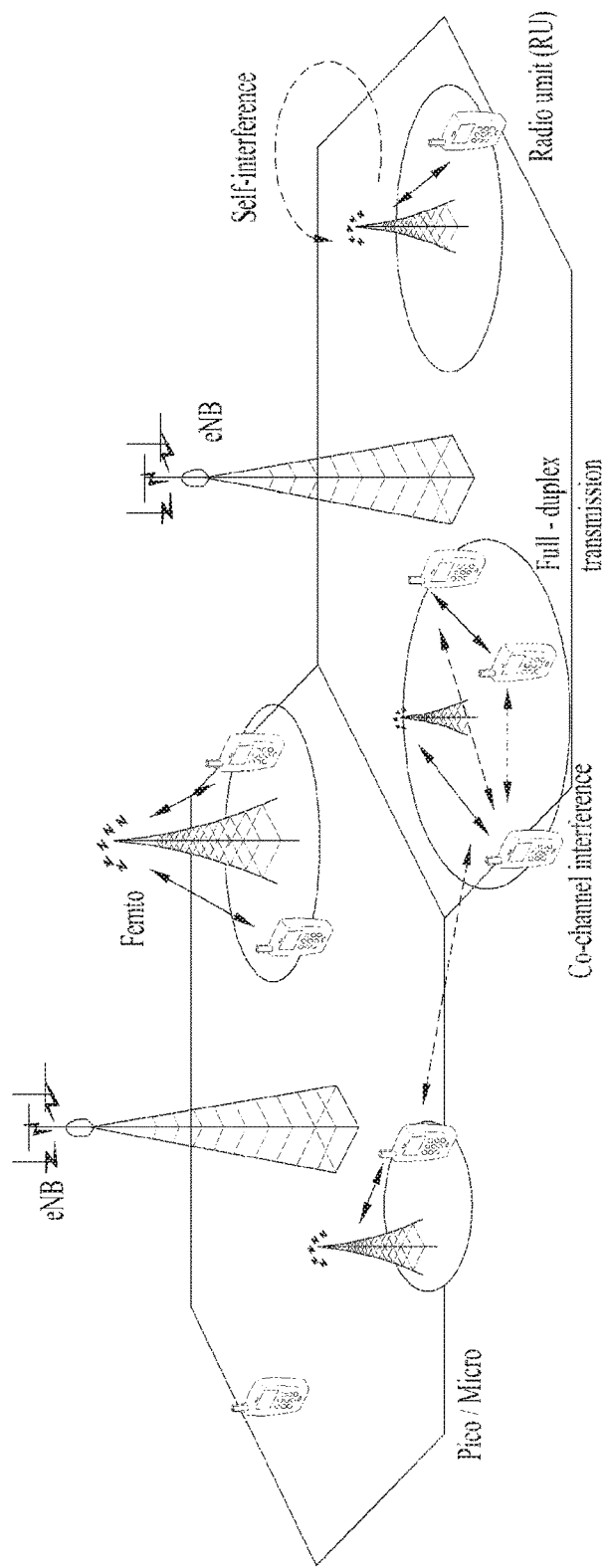
FIG. 10 illustrates an exemplary system supporting FDR transmission.

FIG. 10 illustrates an exemplary system supporting FDR transmission.

Referring to FIG. 10, two types of interference exist in the FDR system.

The first is intra-device interference indicating that a signal transmitted over a transmission antenna of an FDR device acts as interference by being received by a reception antenna of the FDR device. Generally, a self-interference signal is received with higher power than a desired signal. Therefore, it is important to completely cancel intra-device interference through an interference cancellation operation.

The second is inter-device interference in which an uplink signal transmitted by an eNB or a UE acts as interference by being received by an adjacent eNB or UE. In a legacy communication system, since half duplex (e.g., FDD or TDD) in which uplink/downlink transmission is separately performed in frequency or time is implemented, no interference occurs between uplink and downlink. However, an FDR transmission environment in which uplink and downlink share the same frequency/time resource may cause interference between an FDR device and an adjacent device.

Although interference between adjacent cells in the legacy communication system still occurs even in the FDR system, this will not be covered in the present invention.

Figure 11:
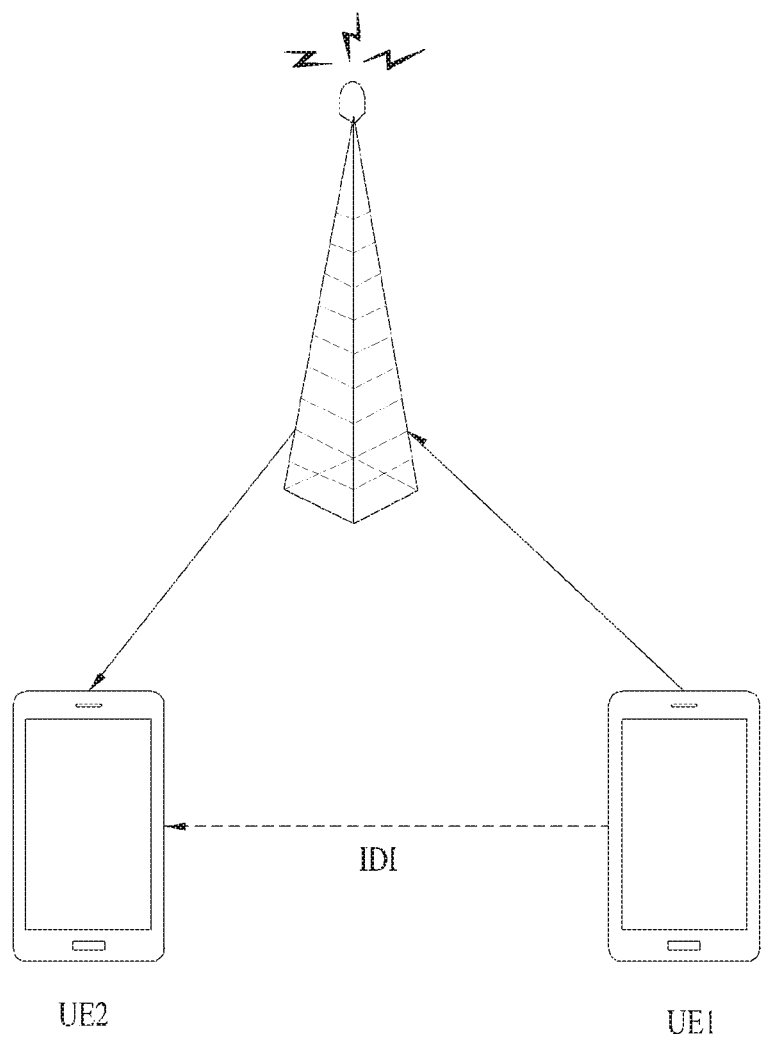
FIG. 11 illustrates exemplary inter-device interference.

FIG. 11 illustrates exemplary inter-device interference.

As described above, Inter-Device Interference (IDI) occurs only in FDR transmission using the same resource in a cell.

Referring to FIG. 11, an uplink signal transmitted by UE 1 to an eNB may act as interference with respect to UE 2.

While two UEs are simply illustrated in FIG. 11 for convenience of description of IDI, features of the present invention are not limited to the number of UEs.

As described above, an FDR system refers to a system simultaneously supporting transmission and reception using the same time and/or the same frequency. That is, for example, uplink transmission of UE1 and downlink reception of UE2 may simultaneously occur. That is, UEs supporting FDR transmission should be capable of simultaneously supporting both uplink and downlink. However, in configurations used in a legacy communication system, since UEs perform either uplink or downlink transmission at one moment, FDR cannot be supported.

TDD Frame Configuration Method of FDR According to the Present Invention

The present invention provides a frame configuration method supporting a TDD communication system using FDR transmission and a distinction signal transmission and reception method supporting the TDD communication system using FDR transmission.

Hereinafter, while it will be assumed for convenience of description that the length of one frame is 10 ms and the length of one subframe is 1 ms as in LTE standards, features of the present invention are not limited to the above length of the radio frame and the above length of the subframe.

As a method supporting FDR transmission, a frame may be configured for each UE so that UEs in a cell can simultaneously perform uplink and downlink transmission.

For example, it is assumed that UE1 is assigned uplink-downlink configuration 3 and UE2 is assigned uplink-downlink configuration 4 of FIG. 2 in the same cell. In this case, UE1 and UE2 may perform simultaneous transmission and reception in subframe 4. That is, the UEs may simultaneously perform transmission and reception in a cell using a different frame configuration per UE in a cell.

In configuring a frame, the frame may be configured such that a minimum of one downlink (D) subframe is included to support transmission of a synchronization signal and relevant system information by an eNB to UEs in a cell.

In addition, since a GP considering timing advance should be deployed prior to uplink transmission of information and data by the UE, a special (S) subframe may be deployed before an uplink (U) subframe.

A variety of types of frame configurations may be used in consideration of non-symmetric downlink/uplink traffic and overhead. In particular, since the synchronization signal and system information are not transmitted in every radio frame, a radio frame without a D subframe or a U subframe may be used.

In addition, at least one U subframe may be included in order to perform HARQ for downlink.

As an example of a subframe configuration, the cell-specific frame configuration of FIG. 2 may be used as a UE-specific frame configuration.

For example, when UE1 of FIG. 11 uses configuration #0 of FIG. 2 and UE2 of FIG. 11 uses configuration #2 of FIG. 11, a Full Duplex (FD) operation of an eNB may be performed in subframes #3, #4, #8, and #9.

According to the present invention, a frame may be configured in consideration of symmetry of data traffic.

Figure 12:
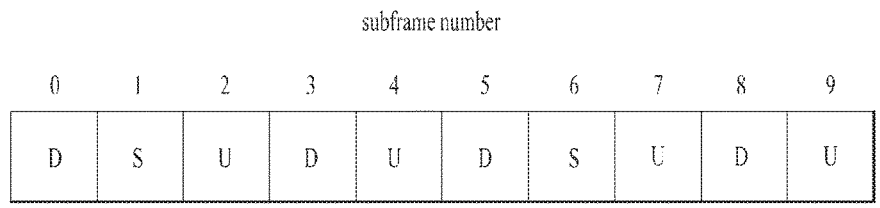
FIG. 12 illustrates an exemplary frame configuration of a peer UE for configuration #1 of FIG. 2.

For example, if a UE uses configuration #1 of FIG. 2 in an FD mode, it is desirable that a peer UE conform to a frame configuration of FIG. 12 for maximum transmission for simultaneously transmitted and received traffic. (Since periodicity is 5 ms, only subframes #3, #4, #8, and #9 may be changed)

FIG. 12 illustrates an exemplary frame configuration of a peer UE for configuration #1 of FIG. 2.

However, it is difficult to actually implement the configuration of FIG. 12 due to a switch-point from downlink to uplink because an S subframe including a GP should be present before subframes #4 and #9. Therefore, when the ratio of D subframes to U subframes in configuration #1 of FIG. 2 is 1:1, two configurations as in FIG. 13 may be used in consideration of a switch-point.

Figure 13:
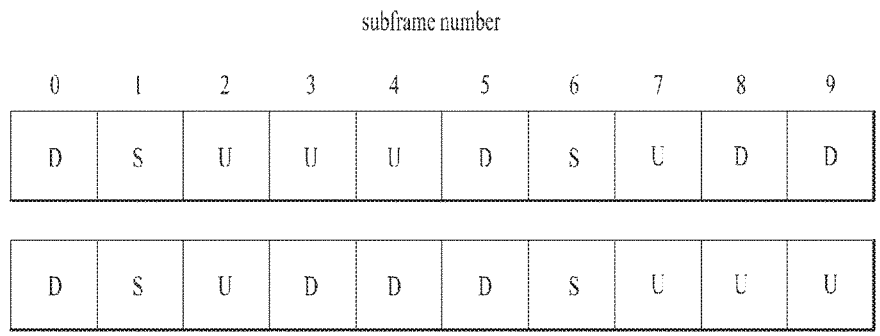
FIG. 13 illustrates two exemplary configurations in which the ratio of D subframes to U subframes is 1:1.

FIG. 13 illustrates two exemplary configurations in which the ratio of D subframes to U subframes is 1:1 as in configuration #1 of FIG. 2.

An embodiment of the present invention proposes a frame configuration in which the number of switch-points from downlink to uplink is minimized in consideration of overhead for various ratios of D subframes and U subframes.

That is, since an S subframe is necessarily needed at a switch-point, a radio frame with less overhead is configured by minimizing S subframes.

IDI occurs in UEs that simultaneously perform transmission and reception in the same cell. Therefore, in order to minimize interference between UEs, it is desirable to distribute U subframes as evenly as possible in subframes of all configurations. Such deployment may maximize use of an FD mode while minimizing the number of UEs that create IDI.

In configuring a new frame, an eNB may recognize the number of U subframes with respect to each subframe of frame configurations which are being used and allocate a U subframe starting from a subframe having the least number of U subframes. In this case, the number of U subframes allocated to a subframe may be distributed by shifting a used configuration. The shifted value may have a maximum of a value ((repetition period of radio frames/transmission time interval (TTI))−1) in consideration of the repetition period of radio frames.

Figure 14:
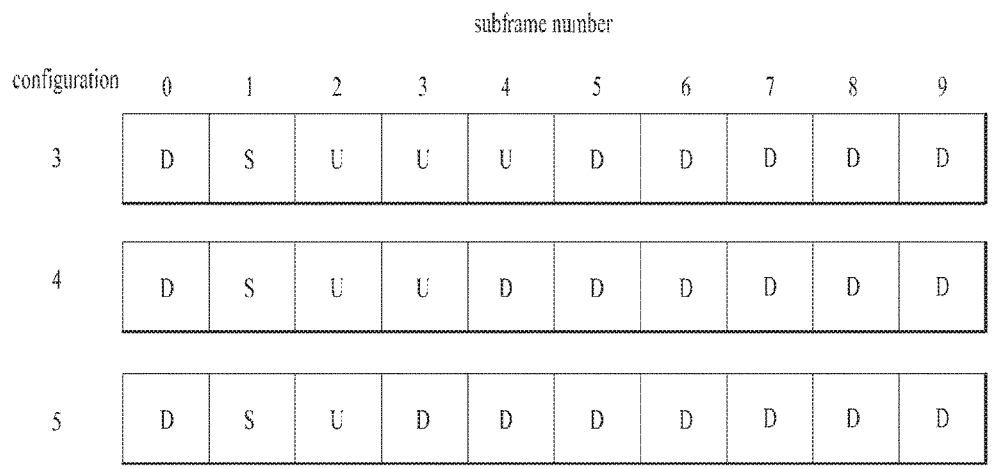
FIG. 14 illustrates exemplary frame configurations considering the minimum number of switch-points.

FIG. 14 illustrates configurations (configurations #3, #4, and #5 of FIG. 2) considering only the minimum number of switch-points in a legacy communication system and FIG. 15 illustrates exemplary frame configurations obtained by shifting subframes so as to distribute U subframes as fairly as possible in addition to consideration of the minimum number of switching points.

As compared with FIG. 14, shift values 0, 3, and 5 are applied to configuration #3, configuration #4, and configuration #5, respectively, in FIG. 15.

In FIG. 14, a UE using configuration #5 is subject to IDI from UEs using configurations #3 and #4 due to subframe #3. On the other hand, UEs in all configurations are subject to IDI from a maximum of one UE in FIG. 15.

Such a deployment method has an advantage of reducing the number of times of performing full search on an identifier capable of distinguishing between UEs as in a method using a signature signal, which will be described below, by reducing the number of UEs that are subjected to interference.

In FIG. 14, the UE using configuration #5 may use an FD mode only in subframe #3 or #4 with another UE. Meanwhile, in FIG. 15, there is an advantage in that the UE using configuration #5 may use the FD mode with another UE in subframes other than subframes #0, #1, #8, and #9.

Meanwhile, frame configurations of FIG. 16 may be established using radio subframes only for an FDR system.

In this case, in order to remove an S subframe, a configuration consisting of only U subframes is used only when the last subframe of a previous radio frame is a U subframe.

If uplink and downlink traffic capacities of large-capacity data (e.g., multimedia data) are similar, a maximum transmission amount may be provided since there are no S subframes in FIG. 16.

An eNB may transmit information indicating a UE-specific configuration to each UE through higher layer signaling.

In this case, the eNB may receive information about traffic from each UE to determine the UE-specific configuration.

In addition, the eNB may receive information about a frame configuration preferred by a UE using Uplink Control Information (UCI) transmitted over a PUCCH. If the information about the frame configuration preferred by the UE is added to the UCI as n bits, a total of $2^n$ configurations may be distinguished.

After receiving the information about traffic or the information about the preferred configuration from the UE, the eNB determines whether to perform a frame configuration in relation to the received information. In determining the configuration, the eNB may simply refer to the information received from the UE or may always accommodate the frame configuration preferred by the UE when the UE strongly demands uplink/downlink transmission.

Alternatively, the UE may transmit a power level of interference received thereby on a subframe basis to the eNB and the eNB may indirectly infer the number of UEs that affect the vicinity of the corresponding UE as interference. Using this, the eNB may change configurations of an interfering UE and a victim UE. In this case, interference information of each subframe may be transmitted through the UCI. For example, whether two or more sources of interference are present may be indicated by a 1-bit indicator per subframe. In FIG. 15, a total of 10 bits is needed.

For example, if configurations #3, #4, and #5 are respectively allocated to three UEs in FIG. 14, a UE using configuration #5 may transmit 10-bit interference information as illustrated in FIG. 17.

The UE may transmit the information about traffic or the information about the preferred configuration to the eNB in every U subframe. Using the received information, the eNB may reset a frame configuration or research for UEs that can most effectively perform an FD mode. For example, when UEs that prefer configurations #0 and #5 of FIG. 2 are present, the eNB may select UEs so as to perform transmission in the FD mode.

The UE may transmit the information about traffic or the information about the preferred configuration in partial U subframes. For example, if a traffic amount or the preferred configuration is changed, the UE may transmit the traffic information or preferred configuration information in partial U subframes. Upon receiving U subframes in which the configuration information is not included, the eNB may not change a frame configuration of the UE or may change the frame configuration of the UE in consideration of a configuration of another UE.

Figure 18:
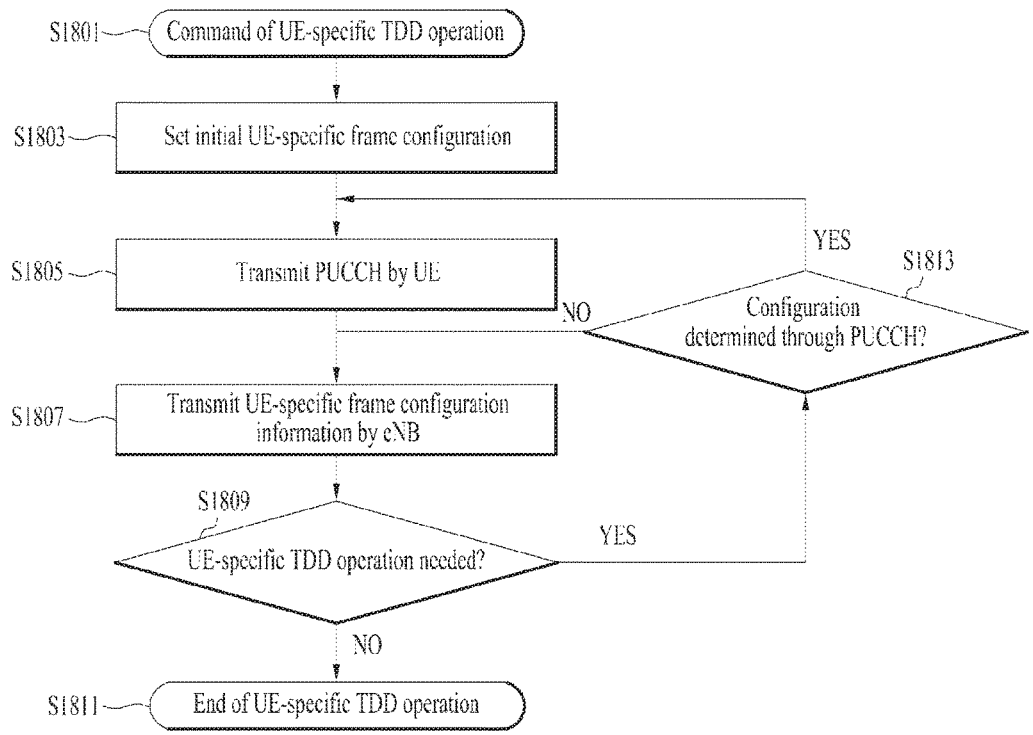
FIG. 18 is a flowchart illustrating an embodiment of the present invention in a UE-specific TDD mode.

FIG. 18 is a flowchart illustrating an embodiment of the present invention in a UE-specific TDD mode.

While UE1 and UE2 of FIG. 11 are assumed as UEs, a method according to this embodiment is identically applied in FDMA or TDMA to UE pairs that operate in an FD mode with respect to two or more UEs.

First, an eNB instructs a UE to perform a UE-specific TDD mode operation (S1801).

The instruction of the UE-specific TDD mode operation may be performed using DCI transmitted over a PDCCH.

Next, the eNB transmits information about an initial UE-specific frame configuration. The initial UE-specific frame configuration may be set such that U subframes and D subframes have the same ratio as in configuration #1 of FIG. 2 in order for uplink and downlink UEs to effectively operate in an FD mode.

Upon receiving the information about the initial UE-specific frame configuration, the UE transmits a PUCCH to the eNB (S1805) and the eNB transmits UE-specific configuration information based on the PUCCH (S1807). In this case, various embodiments of the present invention may be applied to the UE-specific configuration information according to the above-described frame configuration method.

If the UE-specific TDD operation is not needed, the eNB ends the UE-specific TDD operation (S1809 and S1811) and, if the UE-specific TDD operation continues to be performed, the eNB determines whether to use information received through the PUCCH of the UE (S1813). If the PUCCH is used, step S1805 of transmitting the PUCCH is performed and, if the configuration through the PUCCH is not performed, step S1807 of transmitting the UE-specific configuration information is performed.

IDI, which is interference between devices caused by an FD mode, may occur between UEs. To reduce IDI by measuring such interference, a unique signature may be allocated to each UE or UE group. Hereinafter, a signal for interference measurement, capable of distinguishing between UEs, will be referred to as a signature signal.

The UE may be aware of the signal strength of a UE creating IDI, a UE or signature index, a channel vector such as a phase, and timing information, using the signature signal.

The signature signal may be, for example, a code sequence or a puncturing pattern. The signature signal may consist of signals of various forms capable of distinguishing between UEs or UE groups. UE-specific or UE-group-specific scrambling or interleaving may be applied using the code sequence. In order for a reception UE to easily perform interference measurement, only one UE or one UE group may exclusively transmit the signature signal. In this case, an exclusive unit may be at least an OFDM symbol.

For example, if the signature signal is configured by a sequence and is transmitted using one OFDM symbol, the index of the sequence that each UE is to transmit may be calculated through a UE ID. That is, the index may be configured by a function of the UE ID or may be calculated through a modulo (mod) operation when the amount of information constituting the UE ID is greater than the index of the sequence (Sequence Index=(UE ID) mod (Total index number)).

As a specific example, in order to distinguish between signature signals, an m-sequence may be configured using the UE ID or the sequence index. When an m-sequence as indicated by the following equation used in a Secondary Synchronization Signal (SSS) of LTE is used, $N^{(1)}_{ID}$ may calculate m' using the UE ID or the sequence index, thereby distinguishing between signatures.

$$m_0 = m' \bmod 31 \qquad \text{[Equation 12]}$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$

The signature signal is transmitted in all U subframes of each frame configuration. On the contrary, a victim UE caused by IDI receives the signature signal in a D subframe. In addition, partial UEs may receive the signature signal without transmitting information in a U subframe.

To receive the signature signal, the eNB may designate a subframe in which the signature signal can be received to the victim UE caused by IDI, using configuration information of a UE that creates IDI. Alternatively, the eNB may determine a subframe in which a reception UE is to receive the signature signal by transmitting a configuration index of the UE used in an FD mode to the victim UE caused by IDI. Such information may be transmitted through a PDCCH.

Figure 19:
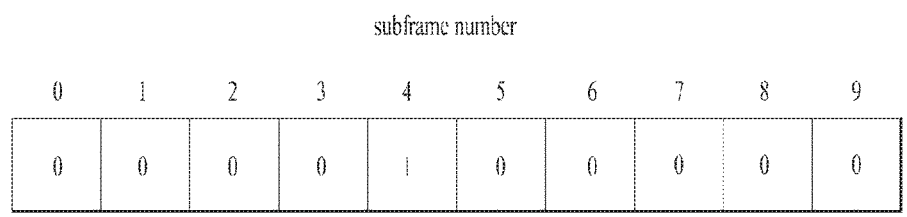
FIG. 19 illustrates 10 bits of a PDCCH transmitted to a UE using configuration #5 when configurations #3 and #5 of FIG. 2 are respectively allocated to two UEs of FIG. 14.

FIG. 19 illustrates 10 bits of a PDCCH transmitted to a UE using configuration #5 when configurations #3 and #5 of FIG. 2 are respectively allocated to two UEs of FIG. 14.

When a configuration index of a UE that creates interference is transmitted, floor($\log_2(n)$) bits for a total of configurations n and floor($\log_2$((repetition period of radio frames/TTI)−1)) bits for a shift value ((repetition period of radio frames/TTI)−1) may be transmitted. In this case, a function of floor(x) indicates a minimum natural number not exceeding x.

If the eNB transmits a radio frame configuration, UEs may be distinguished only by a signature signal in partial U subframes. For example, only two UEs simultaneously perform transmission/reception due to an FD mode of the eNB as in FIG. 11, UE1 may transmit the signature signal only in a subframe in which a U subframe is first configured for UE1 and simultaneously a D subframe is first configured for UE2. That is, a signature transmission/reception timing may be predetermined based on a configuration known to the eNB.

In this case, the eNB may designate a subframe in which the signature signal is to be transmitted using configuration information of a UE affected by interference to a UE that creates interference as well as to the UE affected by interference.

Alternatively, the eNB may determine a subframe in which the signature signal is to be transmitted by transmitting a configuration index of the UE affected by interference. Such information may be transmitted through a PDCCH and may use a total of 10 bits when a reception subframe is indicated.

If the configuration index of the UE affected by interference is transmitted or if a configuration index of the UE that creates interference is transmitted, floor($\log_2(n)$) bits for a total of configurations n and floor($\log_2$((repetition period of radio frames/TTI)−1)) bits for a shift value ((repetition period of radio frames/TTI)−1) may be transmitted.

The measured signature signal may be used for interference cancellation by a reception UE and may be used by the eNB for frame configuration or signature signal allocation.

A UE for measuring the signature signal may feed back signature signal information to the eNB so that the eNB may group UEs into UEs that create IDI and UEs subjected to interference. To this end, the eNB may perform scheduling restriction. That is, UEs in a group are restricted such that allocated time or frequency resources can be separated as much as possible. Alternatively, uplink power control of a UE that creates IDI may be performed to adjust the amount of interference.

A UE receiving the signature signal may acquire channel information of adjacent UEs that create interference. The UE may feed back the channel information to the eNB and the eNB may derive a PMI of an uplink signal of a UE that creates interference using the channel information. That is, the eNB may determine the PMI so as to minimize the effect of an uplink signal of an aggressor UE on a victim UE and such that the uplink signal can be well transmitted to the eNB.

Figure 20:
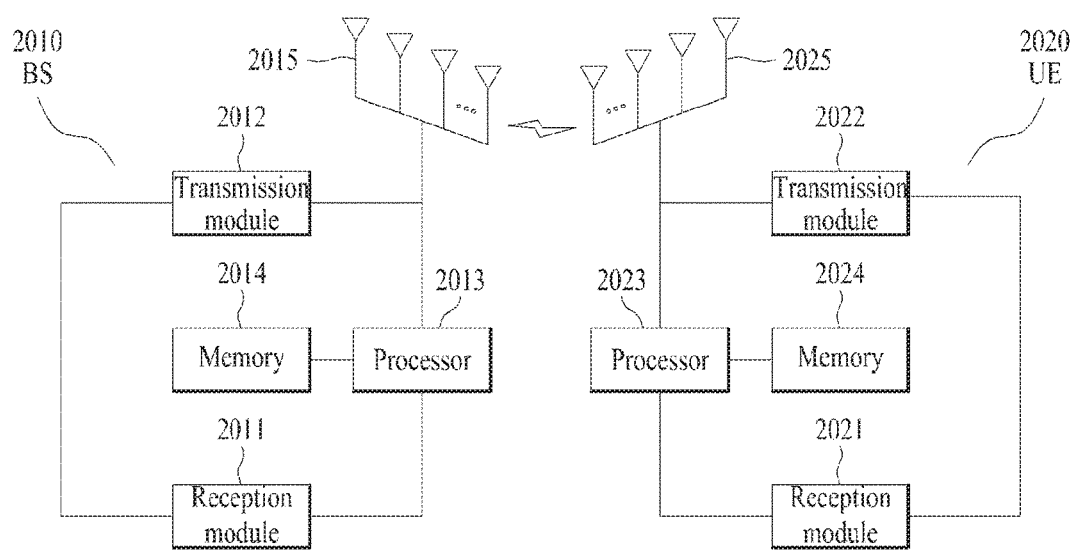
FIG. 20 illustrates a BS and a UE that are applicable to an embodiment of the present invention.

FIG. 20 illustrates a BS and a UE that are applicable to an embodiment of the present invention.

If a wireless communication system includes a relay, communication on a backhaul link is performed between the BS and the relay and communication on an access link is performed between the relay and the UE. Accordingly, the BS or the UE shown in FIG. 20 may be replaced with the relay according to situation.

Referring to FIG. 20, a wireless communication system includes a BS 2010 and a UE 2020. The BS 2010 includes a processor 2013, a memory 2014, and Radio Frequency (RF) units 2011 and 2012. The processor 2013 may be configured to perform the procedures and/or methods proposed in the present invention. The memory 2014 is connected to the processor 2013 and stores various types of information related to operations of the processor 2013. The RF units 2011 and 2012 are connected to the processor 2013 and transmit and/or receive radio signals. The UE 2020 includes a processor 2023, a memory 2024, and RF units 2021 and 2022. The processor 2023 may be configured to perform the proposed procedures and/or methods according to the present invention. The memory 2024 is connected to the processor 2023 and stores various types of information related to operations of the processor 2023. The RF units 2012 and 2022 are connected to the processor 2023 and transmit and/or receive radio signals. The BS 110 and/or the UE 120 may include a single antenna or multiple antennas.

The embodiments of the present invention described above are combinations of elements and features of the present invention in a predetermined form. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed. A specific operation described as being performed by the BS in this disclosure may be performed by an upper node of the BS in some cases. That is, it is apparent that, in a network comprised of a plurality of network nodes including the BS, various operations performed for communication with the UE can be performed by the BS or network nodes other than the BS. The term BS may be replaced with the terms fixed station, Node B, eNode B (eNB), access point, etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit may be located at the interior or exterior of the processor and may transmit and receive data to and from the processor via various known means.

The memory unit may be located inside or outside the processor to exchange data with the processor by various known means.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The present invention may be carried out in other specific ways than those set forth herein without departing from the spirit and essential characteristics of the present invention. The above detailed description is therefore to be construed in all aspects as illustrative and not restrictive. The scope of the invention should be determined by reasonable interpretation of the appended claims, and all changes coming within the meaning and equivalency range of the appended claims are to be embraced therein. Claims that are not explicitly cited in the appended claims may be presented in combination as an exemplary embodiment of the present invention or included as a new claim by subsequent amendment after the application is filed.

INDUSTRIAL APPLICABILITY

The present invention may be used in wireless communication devices such as a UE, a relay, and an eNB.

What is claimed is:

1. A method of allocating a resource by a Base Station (BS) in a wireless access system supporting Full Duplex Radio (FDR) transmission, the method comprising:
   transmitting an initial UE-specific frame configuration regarding a configuration of uplink subframes and downlink subframes to a User Equipment (UE) and each of a plurality of interfering UEs, respectively,
   wherein the UE and the each of the plurality of interfering UEs are configured in a UE-specific Time Division Multiplexing (TDD) mode, and support the FDR transmission;
   receiving response information including at least one of traffic information of the UE or frame configuration information indicating a frame configuration preferred by the UE from the UE;
   determining, based on the response information, a UE-specific frame shift value for at least one of the initial UE-specific frame configurations so as to adjust a ratio between a number of uplink subframes and a number of downlink subframes in a specific subframe of the frame configuration preferred by the UE; and
   transmitting, to a corresponding one of the UE and the plurality of interfering UEs, an updated UE-specific frame configuration based on the determined UE-specific frame shift value,
   wherein the updated UE-specific frame configuration results in a minimal number of uplink subframes of the plurality of interfering UEs in the specific subframe.

2. The method according to claim 1, further comprising transmitting identification information of the plurality of interfering UEs used to measure inter-device interference.

3. The method according to claim 2, further comprising transmitting information about subframes in which the identification information of the plurality of interfering UEs can be received by the UE.

4. The method according to claim 2, wherein the identification information of the plurality of interfering UEs is generated using a code sequence.

5. The method according to claim 1, wherein the respective initial UE-specific frame configurations are configured so that the number of uplink subframes and the number of downlink subframes constituting the respective initial UE-specific frame configurations are the same.

6. The method according to claim 1,
   wherein the determining the UE-specific frame shift value for at least one of the initial UE-specific frame configurations comprises determining the UE-specific frame shift value for at least two or more of the initial UE-specific frame configurations, and
   wherein the transmitting the updated UE-specific frame configuration comprises transmitting the at least two of the initial UE-specific frame configurations to a corresponding two or more of the UE and the plurality of interfering UEs.

7. The method according to claim 1, wherein the determining the UE-specific frame shift value for at least one of the initial UE-specific frame configurations changes the ratio from two uplink subframes: one downlink subframe in the specific subframe to one uplink subframe: two downlink subframes in the specific subframe.

8. A base station (BS) for allocating a resource in a wireless access system supporting Full Duplex Radio (FDR) transmission, the BS comprising:
   a Radio Frequency (RF) unit; and
   a processor, wherein the processor is configured to
   control the RF unit to transmit an initial UE-specific frame configuration regarding a configuration of uplink subframes and downlink subframes to a User Equipment (UE) and each of a plurality of interfering UEs, respectively,
   wherein the UE and the each of the plurality of interfering UEs are configured in a UE-specific Time Division Multiplexing (TDD) mode, and support the FDR transmission,
   control the RF unit to receive response information including at least one of traffic information of the UE or frame configuration information indicating a frame configuration preferred by the UE from the UE,
   determine, based on the response information, a UE-specific frame shift value for at least one of the initial UE-specific frame configurations so as to adjust a ratio between a number of uplink subframes and a number of downlink subframes in a specific subframe of the frame configuration preferred by the UE, and
   control the RF unit to transmit, to a corresponding one of the UE and the plurality of interfering UEs, an updated UE-specific frame configuration based on the determined UE-specific frame shift value,
   wherein the updated UE-specific frame configuration results in a minimal number of uplink subframes of the plurality of interfering UEs in the specific subframe.

9. The BS according to claim 8, wherein the processor is further configured to transmit identification information of the plurality of interfering UEs used to measure inter-device interference.

10. The BS according to claim 9, wherein the processor is further configured to transmit information about subframes in which the identification information of the plurality of interfering UEs can be received by the UE.

11. The BS according to claim 9, wherein the identification information of the plurality of interfering UEs is generated using a code sequence.

12. The BS according to claim 8, wherein the respective initial UE-specific frame configurations are configured so that a number of uplink subframes and a number of downlink subframes constituting the respective initial UE-specific frame configurations are the same.

13. The BS according to claim 8,
  wherein the processor determines the UE-specific frame shift value for at least one of the initial UE-specific frame configurations by determining the UE-specific frame shift value for at least two or more of the initial UE-specific frame configurations, and
  wherein the processor transmits the updated UE-specific frame configuration by transmitting the at least two of the initial UE-specific frame configurations to a corresponding two or more of the UE and the plurality of interfering UEs.

14. The BS according to claim 8, wherein the processor determines the UE-specific frame shift value for at least one of the initial UE-specific frame configurations by changing the ratio from two uplink subframes: one downlink subframe in the specific subframe to one uplink subframe: two downlink subframes in the specific subframe.

* * * * *